United States Patent
Sommier et al.

(10) Patent No.: US 11,174,771 B2
(45) Date of Patent: Nov. 16, 2021

(54) EXHAUST GAS HEATING DEVICE, ASSOCIATED EXHAUST LINE AND VEHICLE

(71) Applicant: FAURECIA SYSTEMES D'ECHAPPEMENT, Nanterre (FR)

(72) Inventors: Thomas Sommier, Belfort (FR); Marc Leroux, Colombier (FR); Sébastien Hanauer, Le Haut Soultzbach (FR); Catherine Guyard, Besancon (FR)

(73) Assignee: FAURECIA SYSTEMES D'ECHAPPEMENT

( * ) Notice: Subject to any disclaimer, the term of this patent is extended or adjusted under 35 U.S.C. 154(b) by 0 days.

(21) Appl. No.: 17/075,871

(22) Filed: Oct. 21, 2020

(65) Prior Publication Data

US 2021/0123369 A1 Apr. 29, 2021

(30) Foreign Application Priority Data

Oct. 28, 2019 (FR) ...................................... 19 12079

(51) Int. Cl.
*F01N 3/20* (2006.01)

(52) U.S. Cl.
CPC .................................. *F01N 3/2026* (2013.01)

(58) Field of Classification Search
CPC .. F01N 3/2026; F01N 2350/00; F01N 3/2842; F01N 3/2013; F01N 3/2828
USPC .......................................................... 422/174
See application file for complete search history.

(56) References Cited

U.S. PATENT DOCUMENTS

| | | | | |
|---|---|---|---|---|
| 4,723,973 A | * | 2/1988 | Oyobe | F01N 3/027 219/552 |
| 5,177,961 A | * | 1/1993 | Whittenberger | F01N 3/2892 60/300 |
| 5,465,573 A | * | 11/1995 | Abe | F01N 13/0097 60/274 |
| 5,525,309 A | * | 6/1996 | Breuer | H05B 3/12 422/174 |

(Continued)

FOREIGN PATENT DOCUMENTS

| | | |
|---|---|---|
| EP | 0566401 A1 | 10/1993 |
| FR | 3065027 A1 | 10/2018 |
| WO | 2012046298 A1 | 4/2012 |

OTHER PUBLICATIONS

French Preliminary Research Report dated Apr. 3, 2020 for French Application No. 1912079.

*Primary Examiner* — Tom P Duong
(74) *Attorney, Agent, or Firm* — Carlson, Gaskey & Olds, P.C.

(57) ABSTRACT

An exhaust gas purification device comprises a first heating element made from an electrically conductive material, a second heating element made from an electrically conductive material, and a power supply configured to circulate an electric current in the first heating element and in the second heating element. The power supply comprises a first electrode electrically connected to the first heating element and a second electrode electrically connected to the second heating element. The heating device includes a substrate extending between the first heating element and the second heating element, and a connecting element electrically connecting the first heating element and the second heating element.

14 Claims, 4 Drawing Sheets

(56) References Cited

U.S. PATENT DOCUMENTS

| | | | | |
|---|---|---|---|---|
| 5,529,759 | A | * | 6/1996 | Sanada .................. F01N 3/281 |
| | | | | 422/174 |
| 5,582,803 | A | * | 12/1996 | Yoshizaki ................ H05B 3/10 |
| | | | | 422/174 |
| 6,585,940 | B2 | * | 7/2003 | Abe ...................... B01J 15/005 |
| | | | | 422/211 |
| 7,070,744 | B2 | * | 7/2006 | Son ...................... F01N 3/0892 |
| | | | | 422/186.04 |
| 8,158,908 | B2 | * | 4/2012 | Konieczny ............ F01N 3/2026 |
| | | | | 219/202 |
| 2001/0043890 | A1 | * | 11/2001 | Son .................. B01D 53/9454 |
| | | | | 422/174 |
| 2011/0030344 | A1 | | 2/2011 | Gonze et al. |
| 2017/0226909 | A1 | * | 8/2017 | Hirth .................... F01N 3/2828 |
| 2018/0291787 | A1 | * | 10/2018 | Bartolo .................. H05B 3/03 |

* cited by examiner

EXHAUST GAS HEATING DEVICE, ASSOCIATED EXHAUST LINE AND VEHICLE

CROSS-REFERENCE TO RELATED APPLICATIONS

This application is a U.S. non-provisional application claiming the benefit of French Application No. 19 12079, filed on Oct. 28, 2019, which is incorporated herein by reference in its entirety.

TECHNICAL FIELD

The present disclosure relates to an exhaust gas heating device for an internal combustion engine, the heating device including a duct defining a circulation passage for the exhaust gases and being configured to conduct the exhaust gases along a central axis of the circulation passage in a circulation direction from an upstream end of the heating device toward a downstream end of the heating device, said heating device comprising:
- a first heating element made from an electrically conductive material, extending in the circulation passage;
- a second heating element made from an electrically conductive material, extending in the circulation passage; and
- a power supply configured to circulate an electric current in the first heating element and in the second heating element, the power supply comprising:
- a first electrode electrically connected to the first heating element; and
- a second electrode electrically connected to the second heating element.

BACKGROUND

Exhaust gas heating devices are primarily used in vehicles comprising internal combustion engines, such as motor vehicles.

Exhaust gas heating devices generally heat the exhaust gases before they enter an exhaust gas purification device. The heating of the exhaust gases before they enter the exhaust gas purification device in particular makes it possible to improve the performance of the exhaust gas purification device.

To that end, it is known to use heating devices comprising a power supply configured to circulate an electric current in a heating element extending in an exhaust gas circulation passage, upstream of an exhaust gas purification device.

The heating element, heated by joule effect, makes it possible to heat the exhaust gases passing through it.

In order to optimize the heating of the exhaust gases, it has been proposed to use an exhaust gas heating device comprising two heating elements supplied with electricity by a power supply and configured to heat the air circulating through these two heating elements.

Such a heating device improves the power of the heating of the exhaust gases, but is not fully satisfactory. Indeed, such a heating device is bulky and its structure does not greatly withstand the vibrations to which it is exposed.

SUMMARY

The disclosure proposes an exhaust gas heating device having a smaller space requirement, the mechanical strength of which is improved, and the electrical control of which is improved.

To that end, the disclosure relates to a gas heating device that includes:
- a substrate extending in the circulation passage between the first heating element and the second heating element, the first heating element extending over an upstream face of the substrate and the second heating element extending over a downstream face of the substrate; and
- a connecting element extending in the circulation passage, the connecting element electrically connecting the first heating element and the second heating element.

According to specific embodiments of the disclosure, the heating device includes one or several of the following features, considered alone or according to any technically possible combinations:
- the first heating element and/or the second heating element are each formed, independently of one another, by an element from the list made up of: a metal grid, a metal foam, and a metal honeycomb structure;
- the connecting element extends along the central axis of the circulation passage;
- the first heating element differs from the second heating element at least by one of the following features: geometry, electrical resistance, material, porosity, density;
- the heating device comprises:
- a first outer support plate extending between the first heating element and the substrate; and/or
- a first inner support plate extending between the first heating element and the substrate; and/or
- a second outer support plate extending between the second heating element and the substrate; and/or
- a second inner support plate extending between the second heating element and the substrate;
- the heating device includes:
- a first annular maintaining part, connected to a periphery of the first heating element and being fastened relative to the duct; and/or
- a second annular maintaining part, connected to a periphery of the second heating element and being fastened relative to the duct;
- the heating device includes a maintaining sheet inserted radially between a periphery of the first annular maintaining part and the duct, and/or inserted radially between a periphery of the second annular maintaining part and the duct;
- the first electrode is electrically connected to the first annular maintaining part and the second electrode is electrically connected to the second annular maintaining part, the substrate advantageously extending between the first annular maintaining part and the second annular maintaining part along the central axis;
- the first annular maintaining part comprises a first maintaining ring, and the second annular maintaining part comprises a second maintaining ring separate from the first maintaining ring;
- the heating device includes a monolithic tubular maintaining element, bearing the first annular maintaining part and the second annular maintaining part such that they extend in the continuation of one another along the central axis around the substrate, the monolithic tubular maintaining element then forming the connecting element; and
- the connecting element is a central electrode extending through the substrate.

The disclosure further relates to an exhaust line of a vehicle including a heating device as cited above.

The disclosure also relates to a vehicle including an exhaust line as cited above.

BRIEF DESCRIPTION OF THE DRAWINGS

Other features and advantages of the disclosure will appear upon reading the following description, provided solely as an example and done in reference to the appended drawings, in which.

DETAILED DESCRIPTION

In the remainder of the disclosure, the terms upstream and downstream are defined based on a flow direction of a fluid from a source, an upstream point being closer to the source of the flow than a downstream point.

Figure 1:
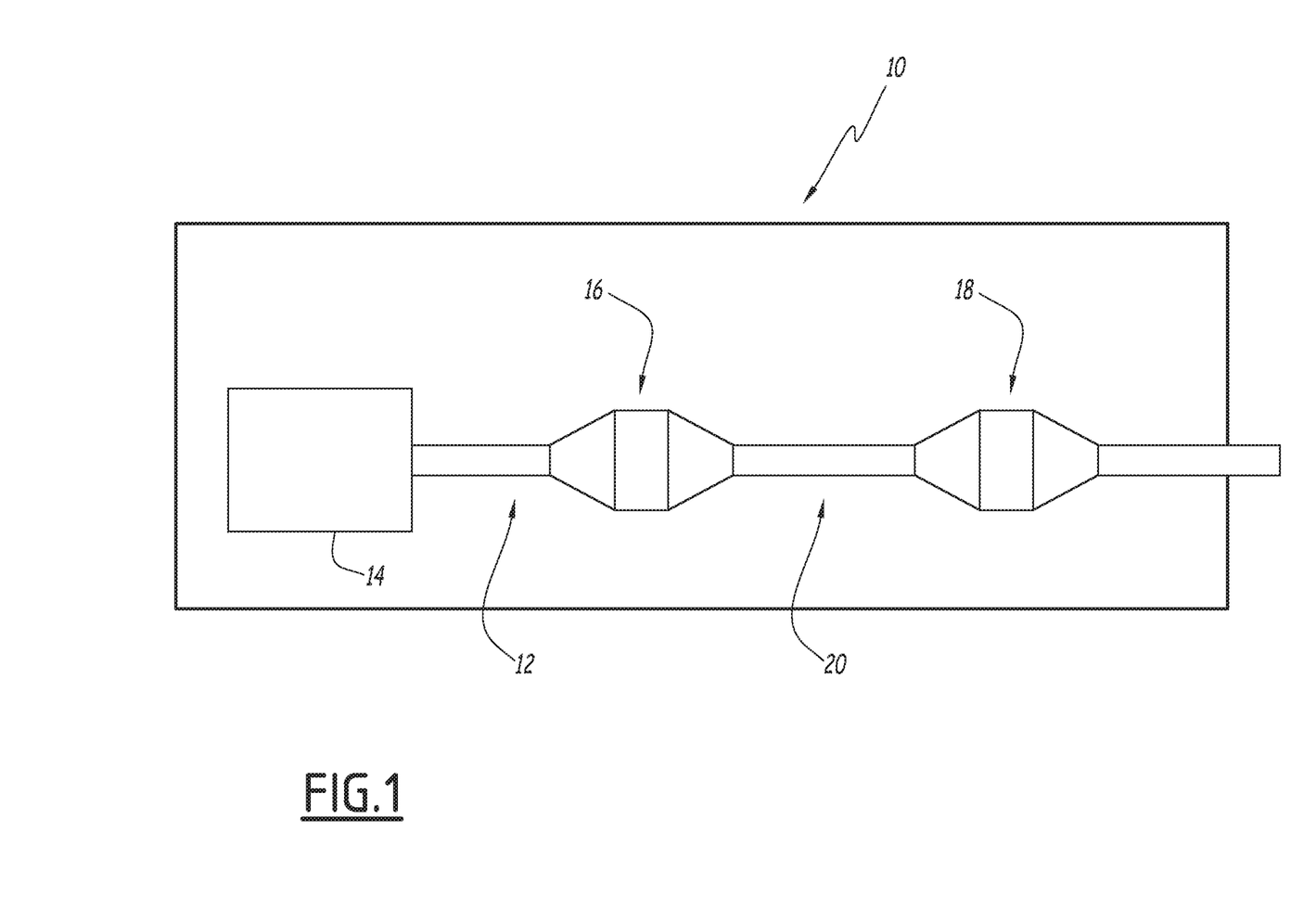
FIG. 1 is a schematic illustration of a vehicle including an exhaust line according to the disclosure.

FIG. 1 shows a vehicle 10 including an exhaust line 12. The exhaust line 12 is, for example, suitable for treating the exhaust gases of an internal combustion engine 14.

The exhaust line 12 includes an exhaust gas heating device 16, and preferably at least one exhaust gas purification device 18 downstream of the heating device 16, as well as a set of channels 20 connecting the elements of the exhaust line 12, in particular the heating device 16 and the purification device 18 from the upstream end of the exhaust line 12 toward the downstream end of the exhaust line 12.

It should be noted that the set of channels 20 is optional, the heating device 16 being able to be arranged just at the inlet of the purification device 18, or the heating device 16 being able to be combined with the purification device 18, the heating device 16 and the purification device 18 then forming only one exhaust gas treatment device.

Figure 2:
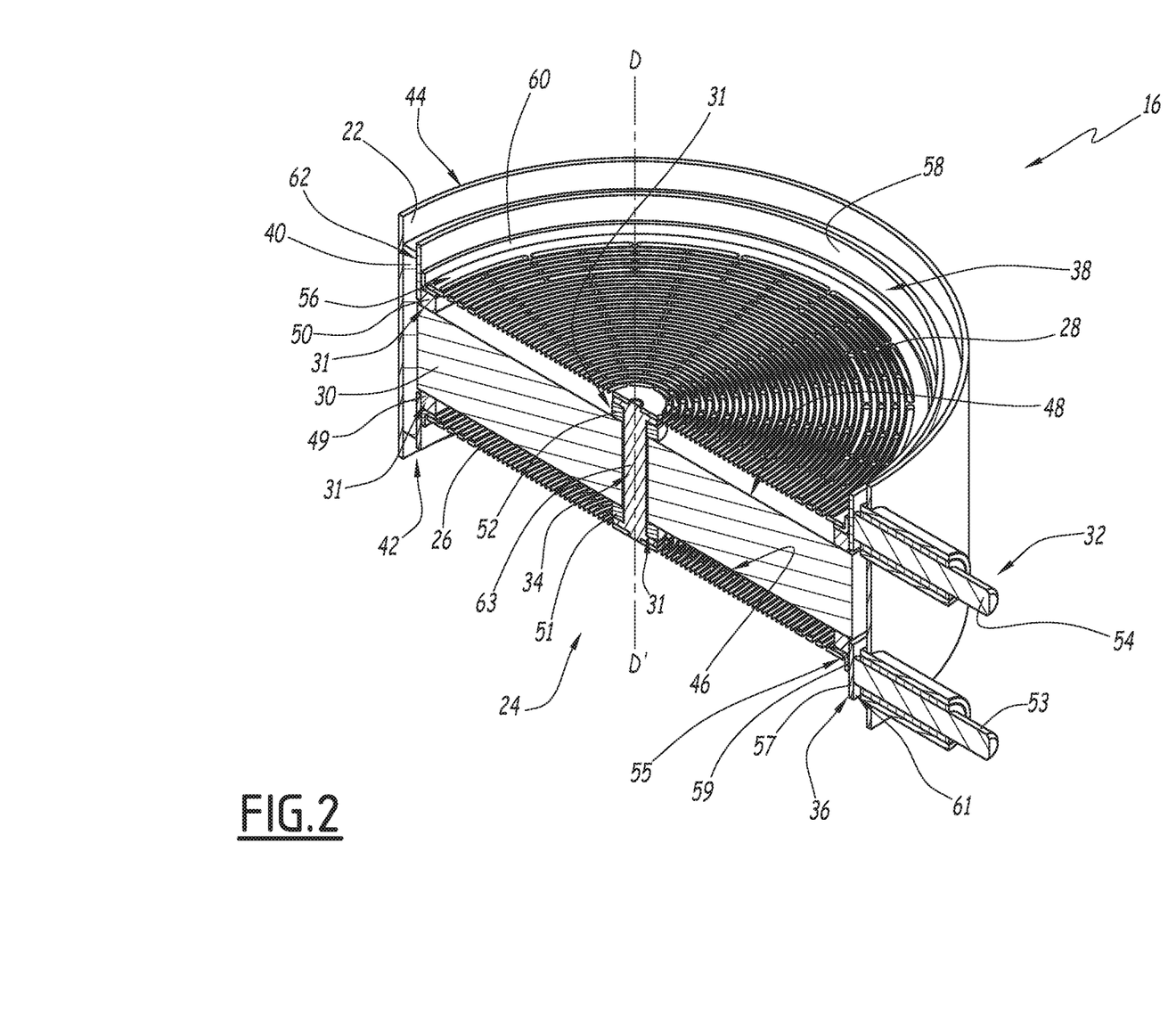
FIG. 2 is a schematic perspective illustration of a heating device according to a first embodiment of the disclosure.

In reference to FIG. 2, showing a first exemplary embodiment of a heating device 16 according to the disclosure, the exhaust gas heating device 16 includes a duct 22 defining a circulation passage 24, a first heating element 26 and a second heating element 28 extending in the circulation passage 24 as well as a substrate 30 extending between the first heating element 26 and the second heating element 28. The first heating element 26 and the second heating element 28 extend through the circulation passage 24, such that the exhaust gases circulating in the circulation passage 24 necessarily pass through these first 26 and second 28 heating elements.

The heating device 16 advantageously comprises a mechanical support assembly 31 in order to provide mechanical support between the heating elements 26, 28 and the substrate 30.

The heating device 16 includes a power supply 32 electrically connected to the first heating element 26 and the second heating element 28, and includes a connecting element 34 electrically connecting the first heating element 26 and the second heating element 28.

The heating device 16 preferably includes, in the circulation passage 24, a first annular part 36 for maintaining the first heating element 26, and/or a second annular part 38 for maintaining the second heating element 28.

The heating device 16, for example, includes a maintaining sheet 40 arranged in the circulation passage 24. This maintaining sheet 40 is radially inserted between the annular maintaining parts 36, 38 and the duct 22.

The duct 22 preferably extends in the continuation of the channels 20, and/or in the continuation of a duct delimiting the purification device 18. The duct 22 is, for example, tubular and is preferably rigid. The duct 22 is configured to conduct the exhaust gases along a central axis D-D' of the circulation passage 24, in a circulation direction from an upstream end 42 of the heating device 16 toward a downstream end 44 of the heating device 16.

The substrate 30 extends in the circulation passage 24. The substrate 30 comprises an upstream face 46 and a downstream face 48. The upstream face 46 and the downstream face 48 are substantially parallel to one another and perpendicular to the central axis D-D'. The gap between the upstream face 46 and the downstream face 48 corresponds to the thickness of the substrate 30. The thickness of the substrate 30 is preferably inclusively between 10 mm and 150 mm.

The substrate 30 extends over substantially an entire cross-section of the circulation passage 24. According to one particular variant shown in FIG. 2, the substrate 30 extends radially between the maintaining sheet 40 and the connecting element 34, the heating device 16 then being configured to guide the exhaust gases through the substrate 30.

The substrate 30 preferably extends longitudinally, in the direction of the axis D-D', between the first annular maintaining part 36 and the second annular maintaining part 38.

The substrate 30 is advantageously porous and suitable for purifying the exhaust gases. The substrate 30 is, for example, a catalytic substrate, for example a ceramic or metallic substrate.

The first heating element 26 and the second heating element 28 are made from an electrically conductive material. The first heating element 26 and the second heating element 28 are, for example, formed by metal grids and/or metal foams and/or metal honeycomb structures.

According to different variants: the first heating element 26 and the second heating element 28 are formed by metal grids, the first heating element 26 and the second heating element 28 are formed by metal foams, the first heating element 26 and the second heating element 28 are formed by honeycomb structures, or one of the first 26 and second 28 heating elements is formed by a metal grid, a metal foam or a metal honeycomb structure while the other of the first 26 and second 28 heating elements is formed by a metal grid, a metal foam or a metal honeycomb structure.

The first heating element 26 and/or the second heating element 28, when they are formed by a grid, include a set of meshes and are suitable for allowing the exhaust gases to circulate between the meshes and for heating the exhaust gases circulating between the meshes. The first heating element 26 and/or the second heating element 28, when they are formed by metal foams, include a set of cells and are suitable for allowing the exhaust gases to circulate between the cells and for heating the exhaust gases circulating in the cells.

The first heating element 26 and the second heating element 28 are configured to heat by Joule effect when they are passed through by an electric current. The electrical resistance of each of these heating elements 26, 28 is, for example, inclusively between 20 Ohm and 200 Ohm, preferably between 50 Ohm and 180 Ohm, and still more preferably between 80 Ohm and 160 Ohm.

The first heating element 26 and the second heating element 28 are substantially planar and extend perpendicular to the central axis D-D'. The first heating element 26 and the second heating element 28, for example, extend through the circulation passage 24.

According to one particular variant shown in FIG. 2, the first heating element 26 extends radially between the first annular maintaining part 36 and the connecting element 34, the heating device 16 then being configured to guide the exhaust gases through the first heating element 26.

According to one particular variant, shown in FIG. 2, the second heating element 28 extends radially between the second annular maintaining part 38 and the connecting element 34, the heating device 16 then being configured to guide the exhaust gases through the second heating element 28.

The first heating element 26 preferably extends near the upstream face 46 of the substrate 30 and the second heating element 28 preferably extends near the downstream face 48 of the substrate 30.

The first heating element 26 and the second heating element 28 are preferably different. In particular, the thickness along the direction of the central axis D-D' or the electrical resistance of the first heating element 26 differs from the thickness along the direction of the central axis D-D' or the electrical resistance of the second heating element 28.

In the variant according to which the first heating element 26 and the second heating element 28 are grids, the length of the wires forming the meshes of the first grid 26, for example, differs from the length of the wires forming the meshes of the second grid 28.

In the variant according to which the first heating element 26 and the second heating element 28 are formed by metal foams, the density of the foam forming the first heating element 26, for example, differs from the density of the foam forming the second heating element 28.

In the variant according to which the first heating element 26 and the second heating element 28 are formed by metal cellular structures, the density of the cells forming the first heating element 26, for example, differs from the density of the cells forming the second heating element 28.

The heating power of the first heating element 26 is, for example, different from the heating power of the second heating element 28 and the heating power of each of the heating elements 26, 28 is, for example, intended to be inclusively between 0.5 kW and 4 kW when the heating device 16 is operating.

The mechanical support assembly 31 comprises a first outer support plate 49, a second outer support plate 50, a first inner support plate 51 and a second inner support plate 52.

The mechanical support assembly 31 is preferably suitable for limiting the friction between the first 26 and the second 28 heating elements and the substrate 30. The mechanical support assembly 31 is preferably configured to damp the movements and vibrations between the first 26 and the second 28 heating elements and the substrate 30.

The mechanical support assembly 31 is suitable for limiting the contact between the substrate 30 on the one hand, and the first 36 and second 38 annular maintaining parts on the other hand.

The mechanical support assembly 31 is arranged, axially relative to the central axis D-D', between the first 26 and second 28 heating elements on the one hand, and the substrate 30 on the other hand. The mechanical support assembly 31 is suitable for preventing direct contact between the first 26 and second 28 heating elements on the one hand, and the substrate 30 on the other hand.

In the variant where the substrate 30 is a ceramic catalytic substrate, the mechanical support assembly 31 is formed from insulating materials, such as a ceramic, for example magnesium oxide, or conductive materials, such as a non-abrasive metal trellis.

In the variant where the substrate 30 is a metal catalytic substrate, the mechanical support assembly 31 is formed from insulating materials, such as a ceramic, for example magnesium oxide.

The support plates 49, 50, 51, 52 are made from a nonabrasive material. The mechanical support plates 49, 50, 51, 52 are preferably made from a material withstanding temperatures inclusively between 850° C. and 1150° C.

The first outer support plate 49 and the first inner support plate 51 together form a spacer extending between the first heating element 26 and the substrate 30 in the direction of the central axis D-D'. The first outer support plate 49 and the first inner support plate 51 are, for example, in the form of concentric rings, the first outer support plate 49 being axially inserted between the first heating element 26 and the substrate 30 on the periphery of the substrate 30 and the first inner support plate 51 being axially inserted between the first heating element 26 and the substrate 30 near the central axis D-D'.

The second outer support plate 50 and the second inner support plate 52 together form a spacer extending between the second heating element 28 and the substrate 30 in the direction of the axis D-D'. The second outer support plate 50 and the second inner support plate 52 are, for example, in the form of concentric rings, the second outer support plate 50 being axially inserted between the second heating element 28 and the substrate 30 on the periphery of the substrate 30 and the second outer support plate 52 being axially inserted between the second heating element 28 and the substrate 30 near the central axis D-D'.

The power supply 32 includes a first electrode 53 and a second electrode 54.

The power supply 32 is, for example, supplied with electrical energy by an electrical energy source of the vehicle 10.

The power supply 32 is configured to circulate an electric current in the first heating element 26 and in the second heating element 28.

The first electrode 53 is electrically connected to the first heating element 26 and the second electrode 54 is electrically connected to the second heating element 28.

According to one particular variant, shown in FIG. 2, the first electrode 53 is electrically connected to a periphery of the first heating element 26 and the second electrode 54 is electrically connected to a periphery of the second heating element 28.

The first electrode 53 is, for example, connected to the first heating element 26 perpendicular to the central axis D-D' and the second electrode 54 is connected to the second heating element 28 perpendicular to the central axis D-D'.

According to the variant of FIG. 2, the first electrode 53 and the second electrode 54 pass through the maintaining sheet 40.

The first electrode 53 is, according to the example of FIG. 2, electrically connected to the first heating element 26 via the first annular maintaining part 36. The second electrode 54 is, for example, electrically connected to the second heating element 28 via the second annular maintaining part 38.

The first annular maintaining part 36 and the second annular maintaining part 38 are made from an electrically conductive material.

The first annular maintaining part 36 is, for example, formed by a first maintaining ring 57 and the second annular maintaining part 38 is, for example, formed by a second maintaining ring 58. The first maintaining ring 57 is, according to this embodiment, separate from the second maintaining ring 58.

Figure 3:
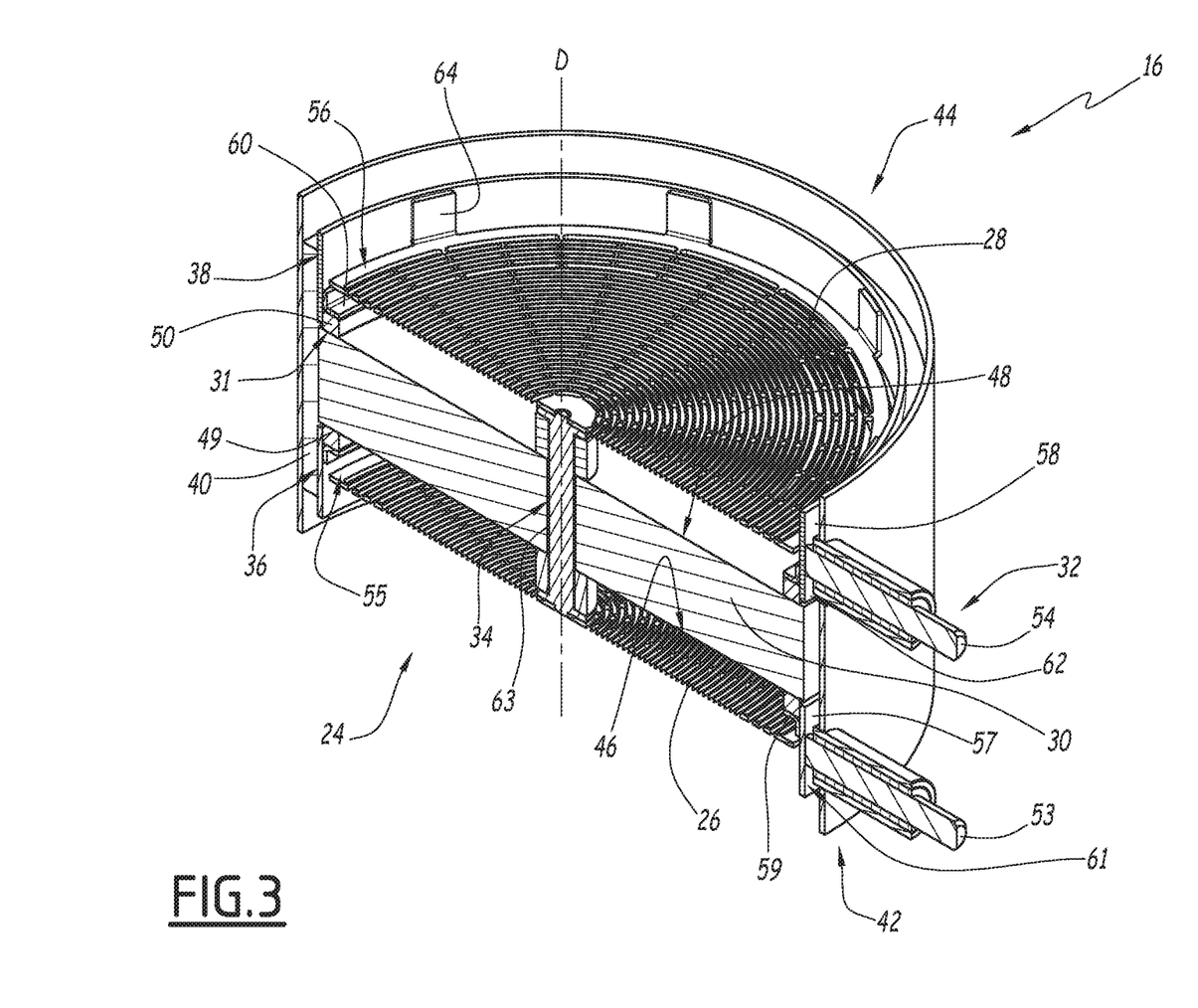
FIG. 3 is a schematic perspective illustration of a heating device according to a second embodiment of the disclosure.

In the embodiment shown in FIG. 2 and FIG. 3, the first annular maintaining part 36 includes the first maintaining ring 57 and a first bent ring 59 radially fastened to the inside of the first maintaining ring 57. The second annular maintaining part 38 includes the second maintaining ring 58 and a second bent ring 60 radially fastened to the inside of the second maintaining ring 58.

The first annular maintaining part 36 is electrically connected to the first heating element 26. The first annular maintaining part 36 is connected to a periphery 55 of the first heating element 26. The first annular maintaining part 36 is, for example, according to the embodiment shown in FIG. 2, welded to the periphery 55 of the first heating element 26. The first annular maintaining part 36 is fastened relative to the duct 22. The first annular maintaining part 36 bears the first heating element 26 in the duct 22.

The first annular maintaining part 36 comprises a periphery 61. The periphery 61 of the first annular maintaining part 36 is, for example, fastened in the duct 22 by the maintaining sheet 40.

The second annular maintaining part 38 is electrically connected to the second heating element 28. The second annular maintaining part 38 is connected to a periphery 56 of the second heating element 28. The second annular maintaining part 38 is, for example, according to the embodiment shown in FIG. 2, welded to the periphery 56 of the second heating element 26. The second annular maintaining part 38 is fastened relative to the duct 22. The second annular maintaining part 38 bears the second heating element 28 in the duct 22.

The second annular maintaining part 38 comprises a periphery 62. The periphery 62 of the second annular maintaining part 38 is, for example, fastened in the duct 22 by the maintaining sheet 40.

The maintaining sheet 40, for example, extends in the duct 22 and extends along the direction of the central axis D-D'.

The maintaining sheet 40 preferably extends longitudinally around the substrate 30, the first annular maintaining part 36 and the second annular maintaining part 38. The maintaining sheet 40 is gripped between the substrate 30, the first annular maintaining part 36 and the second annular maintaining part 38 on the one hand, and the duct 22 on the other hand, such that this maintaining sheet 40 maintains the substrate 30, the first annular maintaining part 36 and the second annular maintaining part 38 in position in the circulation passage 24.

The maintaining sheet 40 is preferably radially inserted between the periphery 61 of the first annular maintaining part 36 and the duct 22.

The maintaining sheet 40 is preferably radially inserted between the periphery 62 of the second annular maintaining part 38 and the duct 22.

The maintaining sheet 40 is electrically insulating.

The maintaining sheet 40, for example, has a base of refractory ceramic fiber. In a variant, the maintaining sheet 40 has a base of alumina-rich polycrystalline fiber, for example mullite.

The connecting element 34 extends in the passage 24, along the central axis D-D' of the passage 24.

In the variant illustrated in FIG. 2, the connecting element 34 is a central electrode 63 extending through the substrate 30.

The central electrode 63 emerges on the one hand on the upstream face 46 of the substrate 30 and on the other hand on the downstream face 48 of the substrate 30.

The central electrode 63 is preferably aligned with the central axis D-D', and electrically connected to the center of the first heating element 26 and the center of the second heating element 28. The central electrode 63, for example, passes through the substrate 30 through an aperture extending at the center of the substrate 30 and the mechanical support plates 49, 50, 51, 52 extend radially around the central electrode 63.

The operation of an exhaust gas heating device 16 as previously described will now be presented.

The power supply 32 supplies electricity to the first heating element 26 and the second heating element 28.

In particular, the electricity is conducted through the first electrode 53 and is conducted around the first heating element 26 by the first annular maintaining part 36. The electricity then circulates from the periphery 55 of the first heating element 26 toward its central region where the connecting element 34 is connected. The first heating element 26 then heats by Joule effect.

The electricity is conducted by the connecting element 34 from the central region of the first heating element 26 where the connecting element 34 is connected toward the central region of the second heating element 28 where the connecting element 34 is connected.

The electricity circulates from the central region of the second heating element 28 where the connecting element 34 is connected toward the periphery 56 of the second heating element 28. The second heating element 28 then heats by Joule effect. The electricity then circulates in the second annular maintaining part 38 and is conducted by the second electrode 54.

The first heating element 26 and/or the second heating element 28 are, for example, configured to heat uniformly over their entire section. In a variant, the first heating element 26 and/or the second heating element 28 are configured to heat uniformly over their entire section, for example less intensely in their peripheral zone relative to their central zone.

The first heating element 26 and the second heating element 28 heat the substrate 30. The first heating element 26 heats the substrate 30 by convection and radiation while the second heating element 28 primarily heats the substrate 30 by radiation.

The first heating element 26 and the second heating element 28 furthermore heat, primarily by convection, all of the elements located downstream from the heating device 16 in the exhaust line, these elements for example being mixers or purification substrates, such as Three-Way Catalysts (TWC), Selective Catalytic Reduction (SCR) devices, SCR-Catalyzed Diesel Particulate Filter (SDPF) devices.

The exhaust gases circulating in the duct 22 are successively heated by the first heating element 26, the substrate 30 and the second heating element 28. The heating of the exhaust gases by the substrate 30 in particular depends on the temperature and the composition of the exhaust gases.

The exhaust gases, for example, leave the heating device 16 at a temperature inclusively between 300° C. and 800° C.

The exhaust gases are also, according to one particular variant, partially purified when they pass through the substrate 30.

A heating device 16 comprising a first heating element 26 and a second heating element 28 as well as a substrate 30 extending between the first heating element 26 and the second heating element 28 is particularly advantageous, since this makes it possible to obtain a heating device 16 having a high mechanical resistance, for example to vibrations, while having a limited volume. The electrical resistance of such a device 16 is also increased, which facilitates the electrical control and limits the peak amperes.

A heating device 16 using porous heating elements 26, 28 such as foam grids or honeycomb structures is particularly advantageous to limit the head losses.

A first heating element 26 different from the second heating element 28 is also particularly advantageous in order to optimize the efficiency of the heating device 16 and to improve its durability. This in particular makes it possible to limit the resonance phenomena between the first heating element 26 and the second heating element 28, but also to adapt the heating of the heating device 16 to the desired exhaust line 12 configuration. According to certain variants, it is advantageous to obtain greater heating by the second heating element 28 than the first heating element 26, in particular in the presence of a SDPF downstream of the heating device 16. According to other variants, it is advantageous to obtain lesser heating by the second heating element 28 than the first heating element 26, in particular to balance the temperatures on either side of the substrate 30 and to improve the durability of the heating device 16.

The use of support plates 49, 50, 51, 52 between the heating elements 26, 28 and the substrate 30 makes it possible to ensure increased durability for the heating device 16 and the substrate 30, while avoiding friction between the heating elements 26, 28 and the substrate 30.

The use of a central electrode 63 is particularly advantageous to limit the radial space requirement of the heating device 16 while ensuring high-performing heating, since it allows the use of a single maintaining sheet 40 to maintain the substrate 30 and the annular maintaining parts 36, 38. Such a central electrode 63 also makes it possible to connect the first 53 and second 54 electrode freely to the peripheries 55, 56 of the heating elements 26, 28.

The first annular maintaining part 36 and the second annular maintaining part 38 connected to the peripheries 55, 56, respectively to the first heating element 26 and the second heating element 28, are particularly advantageous since they allow a homogeneous distribution of the electricity and thus ensure high-performing heating of the exhaust gases.

The use of a maintaining sheet 40 as previously described is particularly advantageous, since it makes it possible to facilitate the mounting of the heating device 16 in the exhaust line 12 and ensures the robustness of the heating device 16, in particular by insulating the heating device 16 from the vibrations coming from the engine 14 and by offsetting the differential expansions of the exhaust line 12. Such a maintaining sheet 40 is also particularly suitable for maintaining the substrate 30. The maintaining sheet 40, by thermally insulating the heating device 16, ensures an improved efficiency of the heating device 16 and reduces the heat losses by conduction.

FIG. 3 shows a second embodiment of the heating device 16. This embodiment differs from the first embodiment shown in FIG. 2 only as follows. Similar elements bear the same references.

According to the second embodiment shown in FIG. 3, the first heating element 26 includes, on its periphery 55, first tabs (not visible in FIG. 3) for fastening to the first annular maintaining part 36 and the second heating element 28 comprises, on its periphery 56, second tabs 64 for fastening to the second annular maintaining part 38. The second fastening tabs 64 are similar to the first fastening tabs.

The fastening tabs 64 are secured to the first 26, respectively the second 28, heating element. The fastening tabs 64 in particular extend along the direction defined by the central axis D-D' and away from the substrate 30.

The use of fastening tabs 64 is particularly advantageous to facilitate the assembly of the heating elements 26, 28 on the annular maintaining parts 36, 38.

Figure 4:
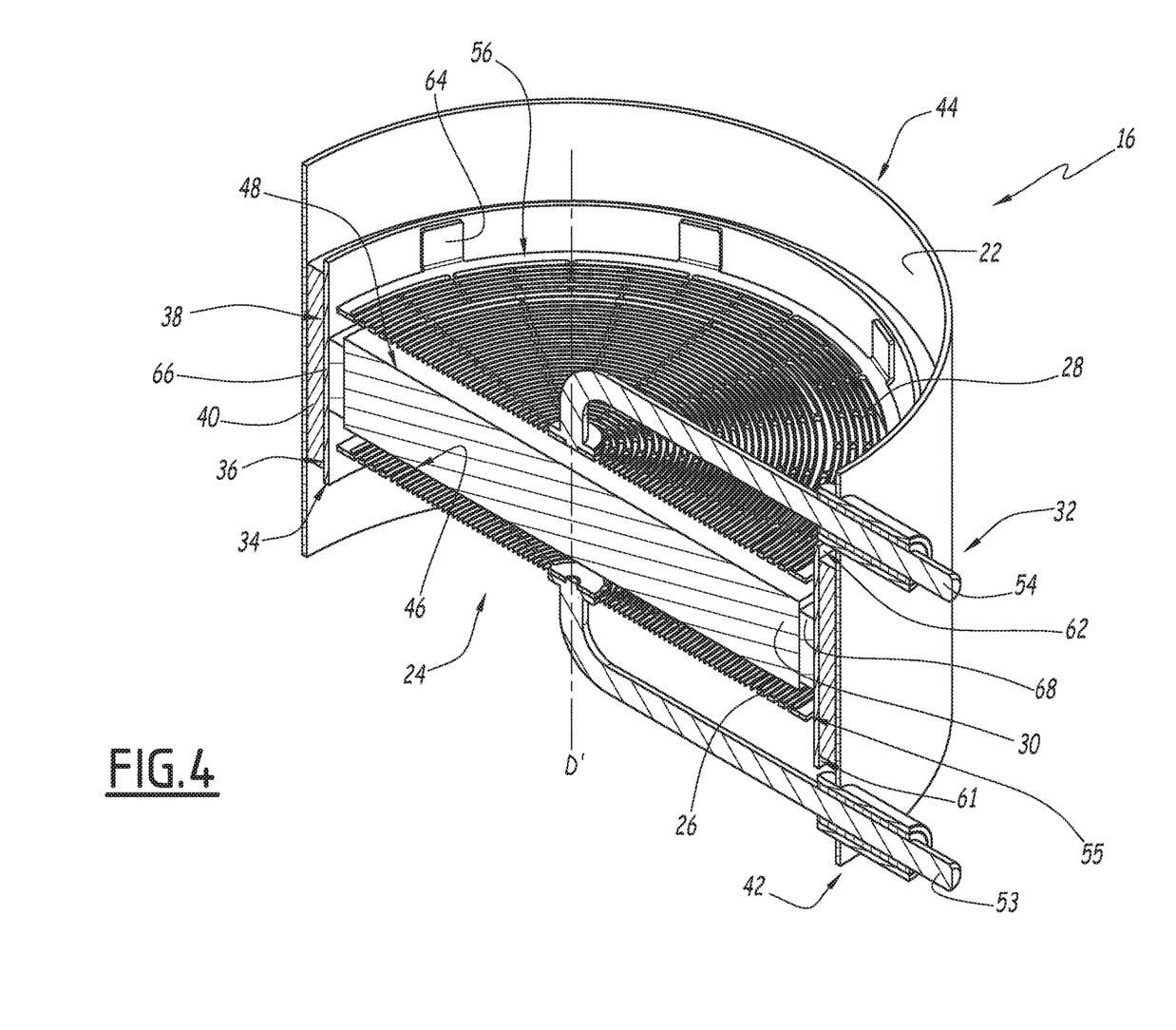
FIG. 4 is a schematic perspective illustration of a heating device according to a third embodiment of the disclosure.

FIG. 4 shows a third embodiment of the heating device 16. This embodiment differs from the second embodiment shown in FIG. 3 only as follows. Similar elements bear the same references.

According to the third embodiment, the heating device 16 includes a monolithic tubular maintaining element 66.

The monolithic tubular maintaining element 66 bears the first annular maintaining part 36 and the second annular maintaining part 38 such that they extend in the continuation of one another in the direction of the central axis D-D' around the substrate 30.

According to this embodiment, the heating device 16 preferably does not include a central electrode 63.

The monolithic tubular maintaining element 66 forms the connecting element 34.

According to this embodiment, the first electrode 53 and the second electrode 54 differ from the electrodes shown in the first and the second embodiment previously described.

The first electrode 53 is for example connected to the first heating element 26 at the center of the first heating element 26 and the connecting end of the first electrode 53 extends along the central axis D-D'. The first electrode 53 is advantageously bent and passes through the duct 22 upstream of the first heating element 26.

The second electrode 54 is, for example, connected to the second heating element 28 at the center of the second heating element 28 and the connecting end of the second electrode 54 extends along the central axis D-D'. The second electrode 54 is advantageously bent and passes through the duct 22 downstream of the second heating element 28.

According to this embodiment, the power supply is then done through the center of the heating elements 26, 28. The first 26 and the second 28 heating elements are connected to one another at their peripheries 55, 56, by the monolithic tubular maintaining element 66 bearing the first annular maintaining part 36 and the second annular maintaining part 38.

According to this embodiment, the maintaining sheet 40 grips the monolithic tubular maintaining element 66, the monolithic tubular maintaining element 66 then extending radially between the maintaining sheet 40 and the substrate 30.

According to the embodiment shown in FIG. 4, the heating device 16 includes a complementary maintaining sheet 68 extending radially between the monolithic tubular maintaining element 66 and the substrate 30. The complementary maintaining sheet 68 is particularly advantageous, since it makes it possible to improve the thermal insulation of the substrate 30.

According to this embodiment, the heating device 16, for example, does not include a mechanical support assembly 31. The first heating element 26 is then offset from the upstream face 46 of the substrate 30, preferably by at least 1 mm, and the second heating element 28 is then offset from the downstream face 48 of the substrate 30, preferably by at least 1 mm.

It will be noted that the disclosure is not limited to the embodiments previously described, but could take the form of additional variants.

The invention claimed is:

1. An exhaust gas heating device for an internal combustion engine, the exhaust gas heating device including a duct defining a circulation passage for exhaust gases and being configured to conduct the exhaust gases along a central axis of the circulation passage in a circulation direction from an upstream end of the exhaust gas heating device toward a downstream end of the exhaust gas heating device, said exhaust gas heating device comprising:
    a first heating element made from an electrically conductive material, extending in the circulation passage;
    a second heating element made from an electrically conductive material, extending in the circulation passage; and
    a power supply configured to circulate an electric current in the first heating element and in the second heating element, the power supply comprising:
    a first electrode electrically connected to the first heating element; and
    a second electrode electrically connected to the second heating element;
    wherein the exhaust gas heating device includes:
    a substrate extending in the circulation passage between the first heating element and the second heating element, the first heating element extending over an upstream face of the substrate and the second heating element extending over a downstream face of the substrate; and
    a connecting element extending in the circulation passage, the connecting element electrically connecting the first heating element and the second heating element.

2. The exhaust gas heating device according to claim 1, wherein the first heating element and/or the second heating element are each formed, independently of one another, by an element from the list made up of: a metal grid, a metal foam, and a metal honeycomb structure.

3. The exhaust gas heating device according to claim 1, wherein the connecting element extends along the central axis of the passage.

4. The exhaust gas heating device according claim 1, wherein the first heating element differs from the second heating element at least by one of the following features: geometry, electrical resistance, material, porosity, density.

5. The exhaust gas heating device according to claim 1, the exhaust gas heating device comprising:
    a first outer support plate extending between the first heating element and the substrate; and/or
    a first inner support plate extending between the first heating element and the substrate; and/or
    a second outer support plate extending between the second heating element and the substrate; and/or
    a second inner support plate extending between the second heating element and the substrate.

6. The exhaust gas heating device according to claim 1, including:
    a first annular maintaining part, connected to a periphery of the first heating element and being fastened relative to the duct; and/or
    a second annular maintaining part, connected to a periphery of the second heating element and being fastened relative to the duct.

7. The exhaust gas heating device according to claim 6, including a maintaining sheet inserted radially between a periphery of the first annular maintaining part and the duct, and/or inserted radially between a periphery of the second annular maintaining part and the duct.

8. The exhaust gas heating device according to claim 6, wherein the first electrode is electrically connected to the first annular maintaining part and the second electrode is electrically connected to the second annular maintaining part.

9. The exhaust gas heating device according to claim 8, wherein the substrate extends between the first annular maintaining part and the second annular maintaining part along the central axis.

10. The exhaust gas heating device according to claim 6, wherein the first annular maintaining part comprises a first maintaining ring, and the second annular maintaining part comprises a second maintaining ring separate from the first maintaining ring.

11. The exhaust gas heating device according to claim 6, including a monolithic tubular maintaining element, bearing the first annular maintaining part and the second annular maintaining part such that they extend in a continuation of one another along the central axis around the substrate, the monolithic tubular maintaining element then forming the connecting element.

12. The exhaust gas heating device according to claim 1, wherein the connecting element is a central electrode extending through the substrate.

13. An exhaust line of a vehicle including the exhaust gas heating device according to claim 1.

14. A vehicle including the exhaust line according to claim 13.

* * * * *